United States Patent
Maroy et al.

(10) Patent No.: US 7,385,019 B2
(45) Date of Patent: Jun. 10, 2008

(54) POLYMER SOLUTIONS WITH SHEAR REVERSIBLE PROPERTIES

(75) Inventors: Pierre Maroy, Saint-Galmier (FR); Arnaud Cadix, Paris (FR); Dominique Hourdet, Paris (FR); Ilias Iliopoulos, Paris (FR); Françoise Lafuma, Paris (FR)

(73) Assignee: Schlumberger Technology Corporation, Sugarland, TX (US)

( * ) Notice: Subject to any disclaimer, the term of this patent is extended or adjusted under 35 U.S.C. 154(b) by 543 days.

(21) Appl. No.: 10/481,148

(22) PCT Filed: Jun. 11, 2002

(86) PCT No.: PCT/EP02/06573

§ 371 (c)(1),
(2), (4) Date: Aug. 23, 2004

(87) PCT Pub. No.: WO02/102917

PCT Pub. Date: Dec. 27, 2002

(65) Prior Publication Data

US 2004/0266629 A1  Dec. 30, 2004

(30) Foreign Application Priority Data

Jun. 18, 2001 (FR) .................... 01 08144

(51) Int. Cl.
*C08F 26/06* (2006.01)
*C08F 126/06* (2006.01)
*C08F 226/06* (2006.01)

(52) U.S. Cl. ................ 526/307.2; 526/258; 526/329.7; 526/318; 526/317.1

(58) Field of Classification Search ............. 526/317.1, 526/318, 329.7, 307.2, 258
See application file for complete search history.

(56) References Cited

U.S. PATENT DOCUMENTS

| 4,432,881 | A | * | 2/1984 | Evani ................. 507/121 |
| 4,694,046 | A | * | 9/1987 | Bock et al. ............ 525/329.4 |
| 4,959,432 | A |   | 9/1990 | Fan et al. ............. 526/287 |
| 5,096,603 | A |   | 3/1992 | Peiffer et al. .......... 507/118 |

FOREIGN PATENT DOCUMENTS

WO  99 38931  8/1999

\* cited by examiner

*Primary Examiner*—Ling-Sui Choi
(74) *Attorney, Agent, or Firm*—Darla Fonseca; David Cate; Robin Nava

(57) ABSTRACT

Water-based fluids that can viscosify under shear or can produce a gel or form a gel under shear are obtained by dissolving polymers in an aqueous phase. These polymers comprise three types of functional groups: non-ionic functional groups that are hydrosoluble at the temperature under consideration, ionic functional groups, and functional groups that are hydrophobic at the temperature under consideration. These three types of functional groups can be distributed or spread in a random distribution along the polymer chain. A slightly block distribution is acceptable. For applications to oil wells, functional groups are used which exhibit LCST (Lower Critical Solution Temperature) behavior (i.e., a low critical solution temperature) instead of hydrophobic functional groups. At temperatures below the LCST, the functional groups are hydrophobic.

35 Claims, 2 Drawing Sheets

POLYMER SOLUTIONS WITH SHEAR REVERSIBLE PROPERTIES

The present invention relates to polymers that can be used to prepare fluids that gel under shear or that viscosify under shear when they are dissolved in an aqueous medium. The term "fluids that viscosify under shear" as used here and throughout the present application means fluids with a viscosity that increases when shear is applied. Such an increase in viscosity is reversible, when the shear is reduced. The term "fluids that gel under shear" as used here and throughout the present application means fluids that can form a gel when shear is applied. The gel is reversible and disappears or is destroyed when the shear is reduced or stopped. Such behavior is in contrast to the behavior of normal polymer solutions wherein, when the solution is sheared, the viscosity reduces, or the gel is destroyed in the case when a gel is formed.

Such products have a number of applications to drilling, to eliminating well or reservoir damage, to fracturing and completion of hydrocarbon-producing wells, geothermal wells and analogous wellbores, and to the field of stimulation techniques intended to optimize the recovery of fluids contained in geological reservoirs. Such products can also be used in numerous other industries, such as vibration attenuators, clutches, in the design of liquids that are transformed into creams when applied and rubbed onto the skin or any other surface, and fluids used to initiate the transmission of shear movement or waves (shear waves are transmitted through a substance in the form of a gel but not through a liquid). Such non-limiting examples demonstrate that the field of application of such substances is extremely wide and covers many different industrial fields.

In the industry corresponding to the field of drilling hydrocarbon-producing wells, a large number of water-soluble (or hydrosoluble) polymers are used that have gelation or viscosifying properties. The most frequently used polymers, such as natural polysaccharides, endow a solution with non-Newtonian properties with low viscosity at high shear rates and high viscosity at rest (shear-thinning fluids). For many applications, however, the opposite behavior is desired (rheo-viscosifying behavior). A known method of secondary hydrocarbon recovery consists in injecting a flushing fluid—such as water to which polymers have been added in order to increase its viscosity—in order to flush the hydrocarbons towards the production well. A fluid in which the viscosity increases reversibly with shear rate could minimize problems with viscous fingering, and could render the displacement front uniform, preventing the formation of pockets of hydrocarbons that have not been flushed. In non-homogeneous reservoir formations where permeability varies from one zone to the next, and in contrast to shear-thinning fluids, rheo-viscosifying fluids minimize the difference in fluid flow rate, reducing by-pass of low permeability zones. When reservoirs exhibit fractures, fluids that viscosify under shear reduce the extent to which porous zones are bypassed by the flooding fluid passing through or via the fracture path (for example in sandstone reservoirs), or to which the narrowest fractures are bypassed to the advantage of the largest fractures (for example, in carbonate reservoirs). Injecting a fluid that gels under shear, in conjunction with suitable pumping conditions, would reduce the width of the largest fractures where shear is higher but would not reduce the width of the narrowest fractures where shear is lower. Thus, in fractured reservoirs, the best way to reduce oil by-pass consists firstly, in pumping a fluid that gels under shear, and then in pumping a fluid that viscosities under shear.

International patent application WO 99/38931 describes fluid compositions comprising precipitated silica nanoparticles and a hydrosoluble copolymer comprising one or more monomers with little or no affinity for silica, and one or more co-monomers that are adsorbed onto the silica. Such compositions are highly effective when preparing fluids that either viscosify under shear or gel under shear. Because of their nanometer scale, the nanoparticle fraction in the components in question must be taken up into suspension in a liquid. For small operations, such as temporary protection of a reservoir formation, such a step is not a problem, but for operations such as enhanced oil recovery (EOR), in which large or very large quantities have to be pumped, this can cause logistical problems on-site.

Despite the innovation of WO99/38931, there still exists a great need for fluids that viscosify under shear or that gel under shear, obtained or prepared by using water to dissolve solid components that can be transported in sacks, thereby making logistics cheaper, and requiring smaller storage and intermediate storage volumes.

Figure 1:
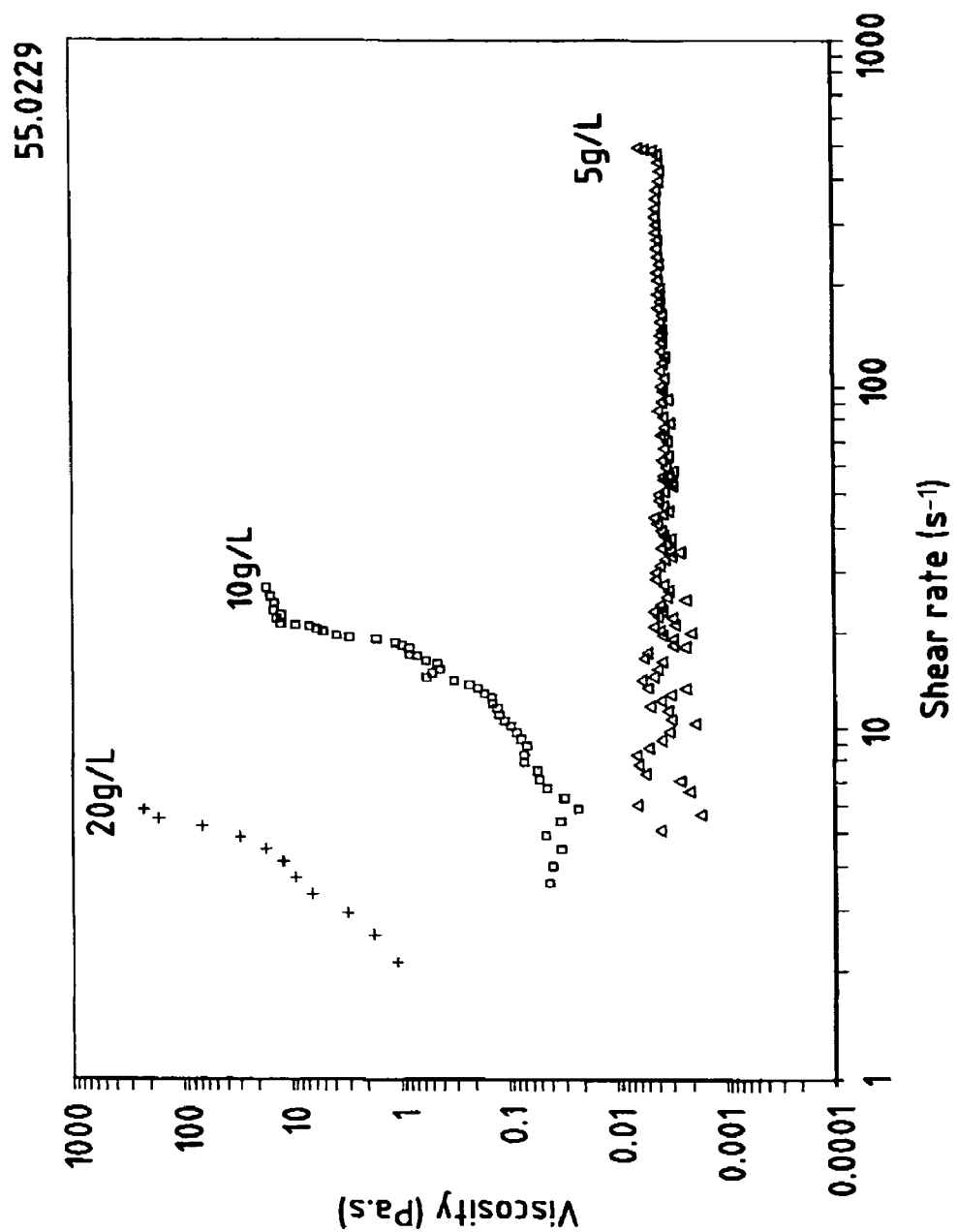
FIGS. 1 and 2 respectively show the different types of viscosity behavior.

The present invention proposes water-based fluids that can viscosify under shear or can produce a gel or form a gel under shear, and that are obtained by dissolving polymers as defined below in an aqueous phase. These polymers comprise three types of functional groups: non-ionic functional groups that are hydrosoluble at the temperature under consideration, ionic functional groups, and functional groups that are hydrophobic at the temperature under consideration. The term "functional groups that are hydrosoluble at the temperature under consideration" means functional groups that might be hydrophobic at a different temperature, but which are hydrosoluble at the temperature at which shear-thickening or gel formation under shear is to occur. The term "functional groups that are hydrophobic at the temperature under consideration" means that the site might be hydrophilic at a different temperature, but the site is insoluble in water at the temperature at which shear-thickening or gelation or setting into a gel is to occur. These three types of functional group are preferably spread or distributed randomly along the polymer chain. Partial or complete block distribution of functional groups in the polymer chain is less preferred.

A particularly preferred feature of the present invention for applications to oil wells resides in the use of functional groups exhibiting LCST (Lower Critical Solution Temperature) behavior (i.e., a low critical solution temperature) instead of hydrophobic functional groups. At temperatures below the LCST, the functional groups are hydrophilic. In that case, the polymer chains do not associate together and the solution behaves like a conventional Newtonian fluid or like a shear-thinning fluid. This allows easy pumping into the well and into the porous formation or into fractures or cracks close to the wellbore. Slightly above the LCST temperature, the functional groups become hydrophobic and the behaviour of thickening or of forming a gel under shear appears in accordance with the present invention. Because of the geothermal temperature gradient, the fluid is progressively heated as it descends into the hole. The fluid is thus very easy to place, and viscosification or gel formation does not appear when it is not desired. For this reason, it is highly preferable in the present invention to use hydrophobic functional groups exhibiting LCST behavior. A non-exhaustive list of LCST type chemicals is provided in the article by Taylor et al., J. Polymer Science, 13, 2551-2570 (1975). This list is non-exhaustive and does not limit the present invention, and is provided solely by way of example Further, the LCST of the fluid can be adjusted to the desired temperature by adding free LCST type chemicals, i.e., chemicals that are not bonded to the polymer, this addition being made to the polymer solution.

To attempt an explanation and propose a better comprehension of the invention, which must not, however, be considered as limiting the present invention, the following possible action mechanism has been proposed. At the temperature under consideration, hydrophobic units form association nodes that can be ruptured or destroyed by applying shear. The associations, which are intra-molecular associations, reorganize themselves and become intermolecular under shear. This increases the apparent molecular weight of the macromolecules, and thus increases the viscosity of the solution. If the network constructed or formed by the nodes becomes three-dimensional, a gel will appear. Incorporating repulsive ionic units tends to stretch the polymer domains or pools slightly, limiting intra-molecular node multiplication and favoring a change in configuration to inter-molecular nodes with more stretched polymer chains. At the temperature under consideration, non-ionic hydrosoluble units provide macromolecules with a certain flexibility and mobility, increasing their solution entropy, and encouraging the formation of intra-molecular nodes on standing.

Different methods exist for incorporating the functional groups into the final polymer.

A) These functional groups can be incorporated by copolymerization or co-condensation of different monomers. In this case, at least two different monomers must be used: a monomer that provides the non-ionic hydrosoluble functional groups and a further monomer that provides the ionic functional groups and the hydrophobic functional groups. It is possible to use more than two co-monomers. The following combinations are given by way of non-limiting example:

Three different co-monomers, each providing one of the above-mentioned desired functional groups, a non-ionic hydrosoluble monomer, an ionic monomer, and an LCST or hydrophobic monomer.

It is also possible to provide the same type of site using more than one monomer, for example a terpolymer comprising two different co-monomers providing the non-ionic hydrosoluble functional groups, and an ionic co-monomer comprising ionic functional groups and hydrophobic functional groups, or a copolymer comprising four co-monomers, one providing the non-ionic hydrosoluble functional groups, another providing hydrophobic functional groups, and two co-monomers providing ionic functional groups with the same type of charge, i.e., anionic or cationic. It is also possible to consider the use of a copolymer incorporating four co-monomers, one providing non-ionic hydrosoluble functional groups, a further providing ionic functional groups, and two co-monomers providing hydrophobic functional groups. The number of co-monomers is not limited, provided that the three types of functional groups are properly incorporated into the copolymer, with no ionic functional groups carrying opposite charges.

B) The non-ionic hydrosoluble functional groups, the ionic functional groups and the hydrophobic functional groups can be added to an existing polymer by means of chemical reactions using reactants capable of reacting with the polymer. The reactions can incorporate grafting or hydrolysis reactions. Some non limiting examples are given below to illustrate this implementation:

It is possible to graft fatty amines to carboxylic acid functional groups to form an amide site substituted by an allyl chain or to use fatty alcohols to produce or form ester functional groups. The acidic functional groups will then become hydrophobic.

It is possible to hydrolyze several ester or amide functional groups to form acidic functional groups.

It is possible to combine the above two reactions to form the final polymer of the invention. Starting from a polyacrylamide, this can be partially hydrolyzed to create acidic functional groups on the polymer chain. A portion of the carboxylic functional groups created can then be reacted with a fatty amine, using a coupling agent to form the final polymer;

It is also possible to react the acidic functional groups with an amine comprising one or more short alkyl radical type substituent(s), to form non-ionic hydrosoluble functional groups. As an example, starting from a polyacrylic acid, and causing methylamine or dimethylamine to react with a fatty amine, a polymer of the invention will be formed.

Amine quaternization represents a reaction for introducing a cationic site to a polymer containing mobile hydrogen atoms.

The above examples are not limiting but serve to demonstrate simply that a number of routes that are already known to the skilled person exist for synthesizing the polymer of the invention, using known means, methods and materials for forming polymers.

C) Any combination of A) and B) can be used.

The final polymer of the present invention has a molecular weight of more than 300,000 g/mole, preferably more than 500,000 g/mole.

If the final polymer has been synthesized using route A), it will contain the following quantities of the three types of functional groups of the invention:

The proportion of hydrophobic units at the temperature under consideration or LCST units will be more than 0.1 mole % of monomer units, preferably more than 0.5 mole % of monomer units. This proportion must also be less than 30 mole % of monomer units, preferably less than 25 mole % of monomer units. This proportion is also limited by the solubility of the final polymer in water at the temperature under consideration. As an example, at ambient temperature, using N,N-dimethylacrylamide as the non-ionic hydrosoluble monomer, the proportion of $-C_{12}H_{25}$ will be limited to less than 20%, and the proportion of $-C_{18}H_{37}$ groups will be limited to less than 10%. Fluorinated hydrophobic functional groups can be used as well as hydrogenated functional groups. The proportion of $-(CH_2)_m-(CF_2)_n-X$ (X=H or F) groups will be less than 10%, with the condition m+n<19 and m<19 if n=0 and n<12 if m=0. Any combination of these two types is possible in the present invention.

The proportion of ionic units will be more than 0.1 mole % of monomer units, preferably more than 0.5 mole % of monomer units. This proportion will also be less than 30 mole % of monomer units.

The proportion of non-ionic hydrosoluble monomer units at the temperature under consideration will be more than 40 mole % of monomer units.

If the polymer has been produced or synthesized using either route B) or route C), the monomer units will be considered as if the polymer had been produced using route A), but using monomers already modified using the reactions involved in routes B) or C). The concentration limits mentioned above will then be the same as those also given above.

The mixing water can contain dissolved added salts, provided that the polymer remains soluble at the temperature under consideration. As an example, with the most soluble non-ionic hydrosoluble monomers such as acrylamide, the amount of salt can be less than 1 mole/liter at ambient temperature. With the least soluble non-ionic hydrosoluble monomers such as N,N'-dimethylacrylamide, the amount of salt can be less than 0.1 mole/liter.

If the polymer contains LCST functional groups, free LCST type chemical substances can be added, i.e., chemical substances that are not chemically bonded to the polymer, addition being made to the mixing water to modify the association temperature of the fluid.

It is also possible to add surfactants to the polymer solution. The effect will be to modify the critical shear rate above which the solution will start to viscosify or form a gel. Such surfactants can be non-ionic, ionic with the same charge or charges as the polymer, or ionic with one or more opposite charges.

Non-ionic surfactants: The concentration of surfactant must be less than 50 times the concentration of hydrophobic functional groups in the polymer, preferably less than 10 times. Adding a surfactant induces a variation in the critical shear rate, and this variation represents either an increase or a decrease depending on the concentration of surfactant. However, the shear-thickening effect disappears when the concentration of surfactant is more than 10 times the concentration of hydrophobic functional groups in the polymer.

Examples of surfactants: $C_nE_m$ (7<n<22 and 3<m<24).

Ionic surfactants with the same charge or charges as the polymer: The concentration of surfactant must be more than 50 times the concentration of hydrophobic polymer functional groups and preferably less than 10 times. The effect of the ionic surfactant is substantially the same as that of the neutral surfactant.

Examples of surfactants: Sodium alkylsulfate;

Ionic surfactant with opposite charge or charges: The concentration of surfactant must be less than 50 times the concentration of hydrophobic functional groups in the polymer and preferably less than 10 times. The effect of the ionic surfactant is substantially the same as that of the neutral surfactant;

Examples of surfactant: Alkyltrimethylammonium bromide.

While the present invention can function with any of the polymers defined above, the following monomers are highly preferred:

Non-ionic hydrosoluble monomers: Highly preferred monomers for use in the context of the invention are acrylamide, its N substituted hydrosoluble derivatives, and hydrosoluble N-vinylamides such as N-vinylacetamide. This list includes N-isopropylacrylamide (NiPAM), except when the co-monomer is MADAP (N,N-[(dimethylamino)propyl]methacrylamide), with its amine site quaternized by an alkyl chain:

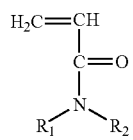

where $R_1$=H to $C_nH_{2n+1}$ and $R_2$=H or $CH_3$.

Ionic monomers: Highly preferred anionic monomers for use in the context of the invention are acrylic acid, methacrylic acid, maleic anhydride, AMS (acrylamidomethylpropylsulfonate), styrenesulfonic acid or vinylsulfonic acid.

Highly preferred cationic monomers are quaternised or non-quaternised vinylpyridine with a pH of less than 2, quaternised or non-quaternised N-vinylimidazole with a pH of less than 7 and monomers with the following two general formulae:

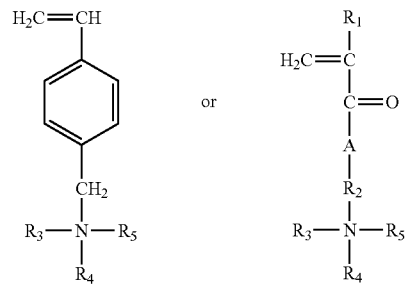

where $R_1$=H or $CH_3$, A=O or NH, $R_2$=$(CH_2)_n$ where n=1 to 3, $R_3$ and $R_5$=H or $CH_3$, $R_4$=H to $C_mH_{2m+1}$. The maximum value of m is a function of the temperature under consideration. These two monomers simultaneously provide the ionic and the hydrophobic function. They can be incorporated into the polymer using any of routes A), B) or C). The higher the temperature, the higher the value of m. At ambient temperature, m is preferably less than 22, more preferably less than 20. Substituent $R_4$ can also be a perfluorinated alkyl chain or any entity between a perfluorinated alkyl chain and an alkyl chain. A mixture of monomers with different substituents can also be highly effective in order to produce a more gradual increase in gel formation or viscosity.

Hydrophobic monomers: Particularly preferred hydrophobic monomers for use in the context of the invention are those from the following family of monomers:

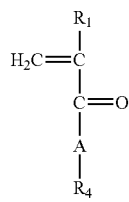

where $R_1$=H or $CH_3$, A=O or NH, $R_4$=$C_nH_{2n+1}$. The minimum value of n is 8. The value of n is a function of the temperature under consideration. These monomers can be incorporated into the polymer using any one of routes A), B) or C). The higher the temperature, the larger the range of n. At ambient temperature, n preferably satisfies the condition 8<n<22, more preferably 10<n<20. Substituent $R_4$ can also be a perfluorinated alkyl chain or any entity between a perfluorinated alkyl chain and an alkyl chain. It is also possible to use hydrophobic silanes and silicones. A mixture of monomers containing different substituents can also be highly effective to produce a more gradual increase in gel formation or viscosity.

By varying the pH of the polymer solution, its Theological behavior can be varied. Four basic situations exist, depending on the type of ions incorporated into the polymer, as well as intermediate situations or cases when different types of ions with the same charge sign are incorporated into the polymer, or when there are different types of charges on a single chain, or again a mixture of polymers with different types of charges of the same sign.

Weak acid functional groups (negatively charged polymer). When the pH falls below the pK of the weak acid functional groups, pH<pK, the polymer solution behaves as a Newtonian fluid up to shear rates of more than 1000 s$^{-1}$. Weak acid functional groups can be provided by carboxylic acid functional groups, for example.

Strong acid functional groups (negatively charged polymer). The polymer solution will retain its gelation/viscosification behavior under shear at all values of pH. Strong acid functional groups can, for example, be provided by sulfonic functional groups.

Weak base functional groups (positively charged polymer). When the pH is increased above the pK of the weak base functional groups, pH<pK, the polymer solution behaves as a Newtonian fluid up to shear rates of more than 1000 s$^{-1}$. Weak base functional groups can be provided by non-quaternised amine functional groups, for example.

Strong base functional groups (positively charged polymer). The polymer solution will retain its gelation/viscosification behavior under shear at all values of pH. Strong base functional groups can, for example, be provided by quaternised amine functional groups (if the amizes are quaternised by protons, they are weak bases; if they are quaternised by alkyl groups, they are no longer bases).

When using mixed charged polymers (with the same charge sign), their solution will have the properties of the two types in a proportion and in an amount depending on the proportions of the charge types.

If desired, buffers can be added to the polymer solutions to modify the pH to a limited extent, when the fluid is pumped into zones with a high or low pH.

The above properties can be very useful for producing delayed pH modification properties (using means that are known to the skilled person), such as Newtonian behavior during pumping and placement of the polymer solution, and rheo-viscosification/gelation behavior once the fluid has been placed in the desired location.

This facilitated pumping can also be carried out using polymers in accordance with the present invention in which the hydrophobic functional groups of the polymer have been replaced by functional groups exhibiting LCST. The polymer chains will start to associate just above the LCST. The LCST temperature will then be selected so that it is below the temperature of the formation to be flushed or completely or partially plugged. The temperature at which the polymer chain starts to associate can be modified by adding to the solution free chemical substances exhibiting a LCST, i.e., chemical substances that are not chemically bonded to the polymer.

EXAMPLES

Polymer Synthesis Examples

Route A)

Direct Terpolymerization Example 70 ml of chloroform, 1.5 g of N-dodecylmethacrylamide, 0.5 ml of acrylic acid in its acid form and 5 ml of N,N-dimethylacrylamide were dissolved in a three-necked flask. The reaction medium was deaerated for one hour by bubbling through nitrogen with stirring. Nitrogen bubbling was maintained throughout the reaction. The temperature was then raised to 60° C. and 15 mg of an initiator (AIBN) was then added. The reaction was allowed to progress for 12 hours, then the reaction medium was precipitated in 3 l of diethyloxide and vacuum dried overnight at ambient temperature.

Route B)

Precursor Synthesis Example

The copolymer precursor syntheses were carried out in water at 30° C. For a copolymer of N,N-dimethylacrylamide (DMA) and acrylic acid (AA), the ratios were 80/20, the monomer concentration was 1 mole/l, the pH was adjusted to 8 using sodium hydroxide and the solution was deaerated for one hour by bubbling through nitrogen prior to introducing ammonium persulfate and sodium metabisulfite already separately dissolved in 2 cm$^3$ of water. For a molecular mass of more than 2000 kcg/mole, the concentration of initiators was as follows: $[(NH_4)_2S_2O_8]/[monomers]=1\%$ and $[(Na_2S_2O_5]/[monomers]=0.03\%$. was allowed to progress for 4 hours. The final solution was neutralized with HCl to a pH of 4-5, it was dialyzed and recovered by freeze drying.

Modification Reaction

A 3% solution of precursor in N-methylpyrrolidone (No) was heated with stirring at 60° C. The necessary quantity of alkylamine (the reference to the alkylamine denotes the number of carbon units constituting the alkyl chain, for example C12 for n-dodecylarine) and this quantity was added with a threefold excess of coupling agent (dicyclohexylcarbodiimide). The reaction was allowed for progress for 12 hours. The reaction medium was precipitated twice in diethyloxide, and vacuum dried overnight at ambient temperature.

Example of Properties of Polymer Solutions

The polymer solution properties were determined by scanning at a static shear rate of 10 s$^{-1}$ per minute in a Couette cell with a sample gap of 0.5 mm. The values for the initial viscosity (when the sample behaves as a Newtonian fluid), the critical shear rate (at which the viscosity starts to rise) and the ratios of the maximum viscosity to the initial viscosity were recorded. Unless otherwise indicated, the acrylic groups were in the basic form, i.e., in the sodium acrylate form.

The polymers in the following examples are denoted by their compositions:

DMA=N,N-dimethylacrylamide, AA=acrylic acid or its salts, Am=acrylamide and xCy is the monomer carrying the alkyl hydrophobic substituent, y representing the number of carbon atoms in the alkyl chain;

The number preceding the name of the monomer represents the proportion of said monomer as a mole percentage in the final copolymer.

Thus, 80DMA/11AA/9C12 means that in the final polymer, there will be 80 mole % of N,N-dimethylacrylamide (DMA), 11 mole % of acrylic acid (AA) and 9 mole % of N-alkylacrylamide carrying a N-alkyl chain containing 12 carbon atoms.

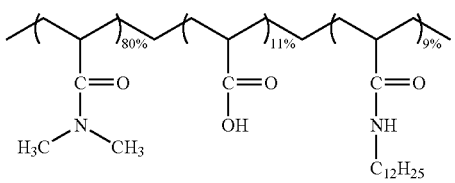

Example 1

Static scanning was carried out under a shear gradient using a 80DMA/11AA/9C12 type polymer (molecular weight MW=3,000,000 g/mole). The different types of behavior are shown in FIG. 1. The increase in viscosity could be sudden (samples gelation under shear) or continuous (samples viscosifying under shear).

Example 2

Figure 2:
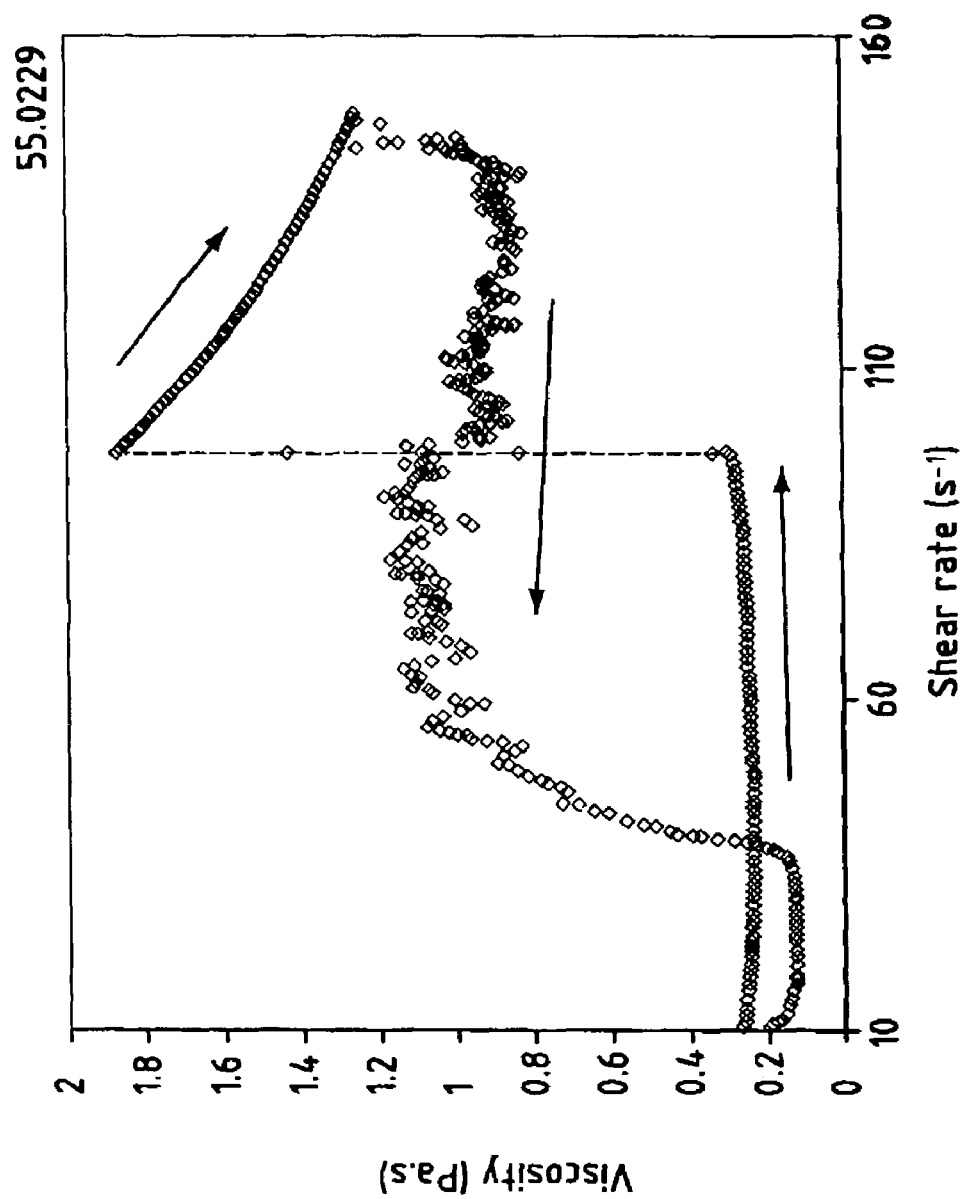

A scan test under static shear was carried out using a 80DMA/10AA/10C12 type polymer (MW=300,000 g/mole) at a concentration of 40 g/l; scanning was carried out up to 150 $s^{-1}$ then back to 0 $s^{-1}$. The graph obtained is shown in FIG. 2. It can be seen that the viscosification under shear effect was reversible.

Example 3

A constant static shear rate was applied to a sample of 80DMA/10AA/10C12 polymer (MW=2,300,000 g/mole) at a concentration of 10 g/l. The time required for gel formation or gelation of the sample was measured and is shown in the table below.

| Shear rate ($s^{-1}$) | 50 | 100 | 200 | 300 | 350 | 400 | 450 | 600 |
|---|---|---|---|---|---|---|---|---|
| Gel formation time (s) | 5900 | 3000 | 1900 | 1400 | 730 | 170 | 9 | 2 |

Example 4

Scan tests were carried out under static shear on a 80DMA/10AA/10C12 type terpolymer and at three different molecular weights and different polymer concentrations.

The results are shown in the following table:

| MW (g/mole) | Concentration (g/l) | Initial viscosity (Pa · s) | Critical shear rate ($s^{-1}$) | $\eta_{max}/\eta_0$ |
|---|---|---|---|---|
| 306,000 | 30 | 0.0073 | 460 | 130 |
| | 40 | 0.23 | 82 | 25 |
| | 50 | 1.6 | 28 | 11 |
| 900,000 | 20 | 0.0071 | 270 | 95 |
| | 25 | 0.14 | 44 | 23 |
| | 30 | 0.76 | 12 | 11 |
| 3,000,000 | 5 | 0.0025 | 660 | 83 |
| | 10 | 0.0080 | 140 | 150 |
| | 20 | 0.44 | 6 | 29 |

Example 5

Static shear scan tests were carried out using a modified 80% DMA/20% AA copolymer precursor (MW=3,000,000 g/mole) with a polymer concentration of 10 g/l with different amounts of modification and with different hydrophobic amines.

The results are shown in the table below:

| Hydrophobic functional groups | Initial viscosity (Pa · s) | Critical shear rate ($s^{-1}$) | $\eta_{max}/\eta_0$ |
|---|---|---|---|
| 1C12 | 0.087 | 49 | 60 |
| 2C12 | 0.05 | 70 | 270 |
| 5C12 | 0.014 | 113 | 110 |
| 10C12 | 0.008 | 140 | 150 |
| 15C12 | 0.004 | 220 | 37 |
| 5C12 | 0.014 | 113 | 110 |
| 5C14 | 0.007 | 235 | 34 |
| 5C16 | 0.006 | 334 | 40 |
| 5C18 | 0.004 | 400 | 61 |

Example 6

Static shear rate scan tests were carried out with terpolymers modified in the hydrophobic compounds by 10 mole % using dodecylamine containing different amounts of charged monomers.

| Composition | Sodium acrylate (mole %) | Concentration (%) | Initial viscosity (Pa · s) | Critical shear rate ($s^{-1}$) | $\eta_{max}/\eta_0$ |
|---|---|---|---|---|---|
| 90DMA/1.5AA/8.5C12 (MW = 3,000,000 g/mole) | 1.5 | 0.3 | 0.0050 | 710 | 2.5 |
| | | 0.5 | 0.013 | 230 | 6.4 |
| | | 1 | 0.17 | 35 | 4.2 |

-continued

| Composition | Sodium acrylate (mole %) | Concentration (%) | Initial viscosity (Pa · s) | Critical shear rate (s⁻¹) | $\eta_{max}/\eta_0$ |
|---|---|---|---|---|---|
| 80DMA/10AA/10C12 (MW = 3,000,000 g/mole) | 10 | 0.5 | 0.0025 | 660 | 83 |
| | | 1 | 0.0080 | 140 | 150 |
| | | 2 | 0.44 | 6 | 29 |
| 70DMA/20AA/10C12 (MW = 2,500,000 g/mole) | 20 | 2 | 0.090 | 1900 | 20 |
| | | 2.5 | 0.22 | 820 | 32 |
| | | 3 | 3.6 | 40 | 88 |

Example 7

When the neutral monomer was a non-substituted actylamide (Am), the viscosification under shear effect appeared with the addition of a salt (in the case sodium chloride). Static shear rate scan tests were carried out with a 80Am/14AA/6C12 (MW=370,000 g/mole) polymer composition at a polymer concentration of 10 g/l.

The results are shown in the table below:

| $C_{NaCl}$ (mole/l) | Initial viscosity (Pa · s) | Critical shear rate (s⁻¹) | $\eta_{max}/\eta_0$ |
|---|---|---|---|
| 0.001 | 3.9 | 0.3 | 1.6 |
| 0.01 | 2.4 | 0.7 | 2.5 |
| 0.1 | 0.18 | 3 | 6.3 |
| 1 | 0.045 | 11 | 2.4 |

Example 8

A 80DMA/20AA polymer was grafted with P(EOPO) oligomers (MW=2,000 g/mole) in an amount of 50% by weight of the final polymer. The proportion of propylene oxide (PO) to ethylene oxide (EO) was 39/6. A static shear rate scan test was carried out at different temperatures with a polymer concentration of 3 g/l. The sample was of the shear-thinning type at low temperature and shear-thickening at high temperature (above 30° C.).

The results are shown in the table below:

| Temperature | Initial viscosity (Pa · s) | Critical shear rate (s⁻¹) | $\eta_{max}/\eta_0$ |
|---|---|---|---|
| 25 | 0.094 | / | / |
| 25 | 0.084 | 8 | 3.7 |
| 40 | 0.038 | 21 | 29 |
| 50 | 0.023 | 100 | 13 |

Example 9

Static shear rate scan tests were carried out on a 80DMA/18AA/2C12 (MW=3,000,000 g/mole) polymer at a concentration of 5 g/l, the precise proportion of NaCl or HCl being added to the solutions to demonstrate the effect of pH on gelation under shear.

| pH | Initial viscosity (Pa · s) | Critical shear rate (s⁻¹) | $\eta_{max}/\eta_0$ |
|---|---|---|---|
| 5.1 | 0.0027 | 1830 | 19 |
| 7.3 | 0.0044 | 850 | 41 |
| 9.3 | 0.0064 | 170 | 135 |

Example 10

Static shear rate scan tests were carried out with a 80DMA/15AA/5C12 (MW=3,000,000 g/mole) polymer at different concentrations of neutral surfactant (in this case, C12E8 surfactant).

The results are shown in the following table:

| Surfactant concentration (mole/l) | Initial viscosity (Pa · s) | Critical shear rate (s⁻¹) | $\eta_{max}/\eta_0$ |
|---|---|---|---|
| 0 | 0.014 | 113 | 110 |
| $10^{-5}$ | 0.0053 | 151 | 220 |
| $10^{-3}$ | 0.0083 | 99 | 203 |
| $10^{-2}$ | 0.024 | 22 | 134 |
| $10^{-1}$ | 0.057 | 420 | 3.4 |

Other characteristics and advantages of the invention will be better understood from the following description made with reference to the accompanying drawings in which:

EXAMPLES

The invention also encompasses all embodiments and applications that are directly accessible to the skilled person on perusing the present application from his own experience.

The invention claimed is:

1. A polymer fluid, the polymer comprising:
   non-ionic hydrosoluble functional groups corresponding to one or more of the following monomers: acrylamide, N substituted acrylamide derivatives and N-vinylamides;
   ionic functional groups corresponding to one or more of the following monomers: acrylic acid, methacrylic acid, maleic anhydride, acrylamidomethylpropylsulphonate, styrene sulphonic acid, vinyl sulphonic acid, vinylpyridine, quaternary ammonium salts of vinylpyridine, N-vinylimidazole, quaternary ammonium salts of N-vinylimidazole, and monomers of general formulae:

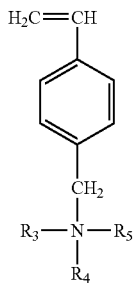 or 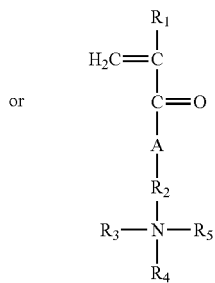

where $R_1$=H or $CH_3$,
A=O or NH,
$R_2$=$(CH_2)_n$ where n=1 to 3,
$R_3$ and $R_5$=H or $CH_3$, and
$R_4$=H to $C_mH_{2m+1}$, where m is less than 22, or perfluorinated derivatives thereof; and
hydrophobic functional groups corresponding to one or more of the following monomers: monomers of general formula —$(CH_2)_m$—$(CF_2)_n$—X wherein X=H or F, m+n<19, m<19 if n=0, and n<12 if m=0, and monomers of general formula:

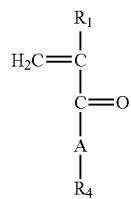

where $R_1$=H or $CH_3$, A=O or NH, $R_4$=$C_nH_{2n+1}$ or perfluorinated derivatives thereof, and n≧8, a hydrophobic silane, or a silicone;
the viscosity of the fluid increasing when the fluid is subjected to shear,
wherein the ionic monomers comprise at least one of vinylpyridine with a pH of less than 2 or quaternary ammonium salts thereof, and N-vinylimidazole having a pH of less than 7 or quaternary ammonium salts thereof and
wherein the proportion of ionic monomer units in the polymer is more than 0.1 mol %.

2. The polymer fluid of claim 1, wherein the non-ionic hydrosoluble monomers comprise at least one of N,N-dimethylacrylamide, N-vinylacetamide and N-isopropylacrylamide.

3. The polymer fluid of claim 1, wherein the hydrophobic monomer comprises monomers of general formula:

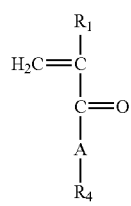

where $R_1$=H or $CH_3$, A=O or NH, $R_4$=$C_nH_{2n+1}$ or perfluorinated derivatives thereof, and 8<n<22.

4. The polymer fluid of claim 3, wherein 10<n<20.

5. The polymer fluid of claim 1, wherein the polymer has a molecular weight of more than 300,000.

6. The polymer fluid of claim 5, wherein the polymer has a molecular weight of more than 500,000.

7. The polymer fluid of claim 1, wherein the proportion of hydrophobic monomer units in the polymer is more than 0.1 mol %.

8. The polymer fluid of claim 7, wherein the proportion of hydrophobic monomer units in the polymer is more than 0.5 mol %.

9. The polymer fluid of claim 1, wherein the proportion of hydrophobic monomer units in the polymer is less than 30 mol %.

10. The polymer fluid of claim 9, wherein the proportion of hydrophobic monomer units in the polymer is less than 25 mol %.

11. The polymer fluid of claim 1, wherein the proportion of ionic monomer units in the polymer is more than 0.5 mol %.

12. The polymer fluid of claim 1, wherein the proportion of ionic monomer units in the polymer is less than 30 mol %.

13. The polymer fluid of claim 1, wherein the proportion of non-ionic hydrosoluble monomer units in the polymer is more than 40 mol %.

14. The polymer fluid of claim 1, wherein the polymer is mixed with water to form the fluid.

15. The polymer fluid of claim 14, further comprising at least one non-ionic surfactant.

16. The polymer fluid of claim 15, wherein the concentration of non-ionic surfactant is less than 50 time the concentration of the hydrophobic functional groups in the polymer.

17. The polymer fluid of claim 16, wherein the concentration of non-ionic surfactant is less than 10 time the concentration of the hydrophobic functional groups in the polymer.

18. The polymer fluid of claim 14, further comprising at least one ionic surfactant having the same charge as that of the polymer.

19. The polymer fluid of claim 18, wherein the concentration of non-ionic surfactant is less than 50 time the concentration of the hydrophobic functional groups in the polymer.

20. The polymer fluid of claim 19, wherein the concentration of non-ionic surfactant is less than 10 time the concentration of the hydrophobic functional groups in the polymer.

21. The polymer fluid of claim 14, further comprising at least one ionic surfactant having an opposite charge to that of the polymer.

22. The polymer fluid of claim 21, wherein the concentration of non-ionic surfactant is less than 50 time the concentration of the hydrophobic functional groups in the polymer.

23. The polymer fluid of claim 22, wherein the concentration of non-ionic surfactant is less than 10 time the concentration of the hydrophobic functional groups in the polymer.

24. The polymer fluid of claim 14, wherein the polymer is present in a concentration of 5-50 g/l.

25. The polymer fluid of claim 14, further comprising at least one buffer for modifying the pH of the solution when in the presence of external pH modifiers.

26. A method of preparing the polymer fluid of claim 1, comprising copolymerization or co-condensation of at least two different monomers, one of which provides the non-ionic hydrosoluble functional groups and a further monomer that provides the ionic functional groups and the hydrophobic functional groups.

27. The method of claim 26, comprising copolymerisation or co-condensation of three different co-monomers, each providing one of the functional groups.

28. The method of claim 26, comprising copolymerisation or co-condensation of a terpolymer comprising two different co-monomers providing the non-ionic hydrosoluble functional groups, and an ionic co-monomer comprising ionic functional groups and hydrophobic functional groups, or a copolymer comprising four co-monomers, one providing the non-ionic hydrosoluble functional groups, another providing hydrophobic functional groups, and two co-monomers providing ionic functional groups with the same type of charge.

29. The method of claim 26, comprising copolymerisation or co-condensation of a copolymer incorporating four co-monomers, one providing non-ionic hydrosoluble functional groups, a further providing ionic functional groups, and two co-monomers providing hydrophobic functional groups.

30. A method of preparing the polymer fluid of claim 1, comprising adding non-ionic hydrosoluble functional groups, the ionic functional groups and the hydrophobic functional groups to an existing polymer by means of chemical reactions using reactants capable of reacting with the polymer.

31. The method of claim 30, wherein the reactions include grafting or hydrolysis reactions.

32. A method of preparing the polymer fluid of claim 1, comprising copolymerization or co-condensation of at least two different monomers, one of which provides the non-ionic hydrosoluble functional groups and a further monomer that provides the ionic functional groups and the hydrophobic functional groups and further comprising adding non-ionic hydrosoluble functional groups, the ionic functional groups and the hydrophobic functional groups to an existing polymer by means of chemical reactions using reactants capable of reacting with the polymer.

33. A cosmetic formulation including the polymer fluid of claim 1.

34. A fluid used to initiate the transmission of shear movement or waves including the polymer fluid of claim 1.

35. A method of treating wells or underground reservoirs including the use of the polymer fluid of claim 1.

* * * * *